Dec. 18, 1934.                    E. A. NELSON                    1,985,054
                                      WHEEL
                              Filed Jan. 21, 1931          3 Sheets-Sheet 1
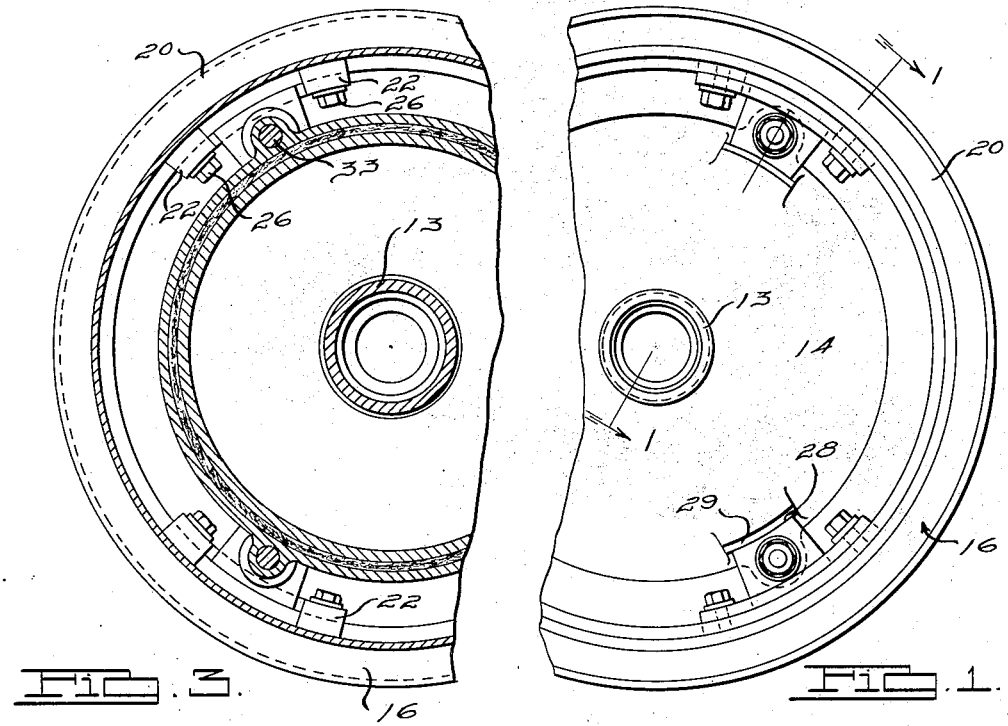
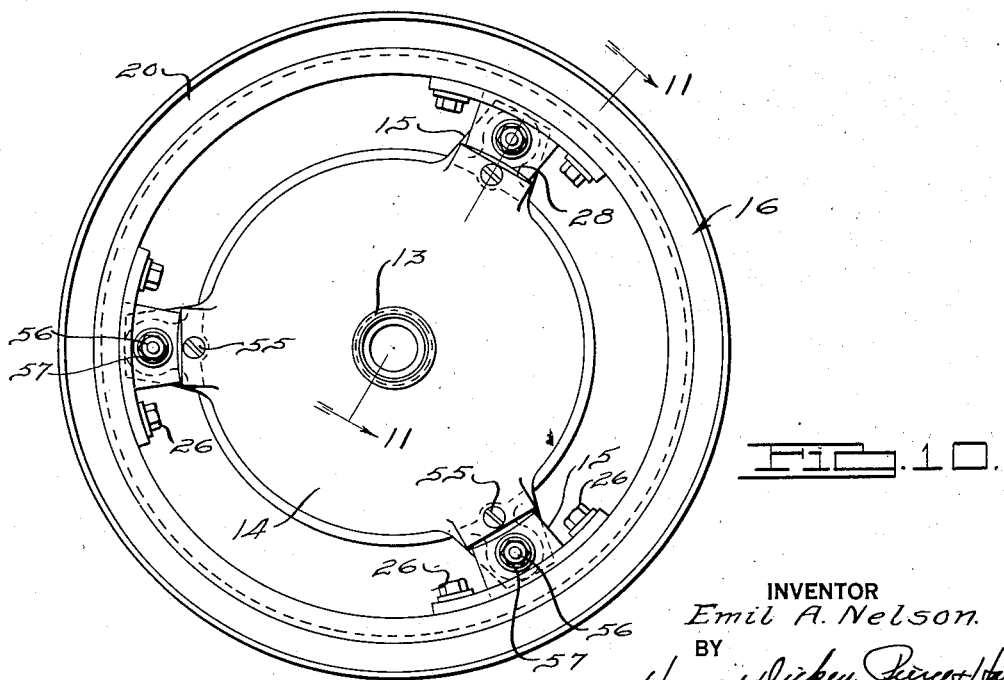
INVENTOR
Emil A. Nelson.
BY
ATTORNEYS.

Dec. 18, 1934.　　　　E. A. NELSON　　　　1,985,054
WHEEL
Filed Jan. 21, 1931　　　3 Sheets-Sheet 2
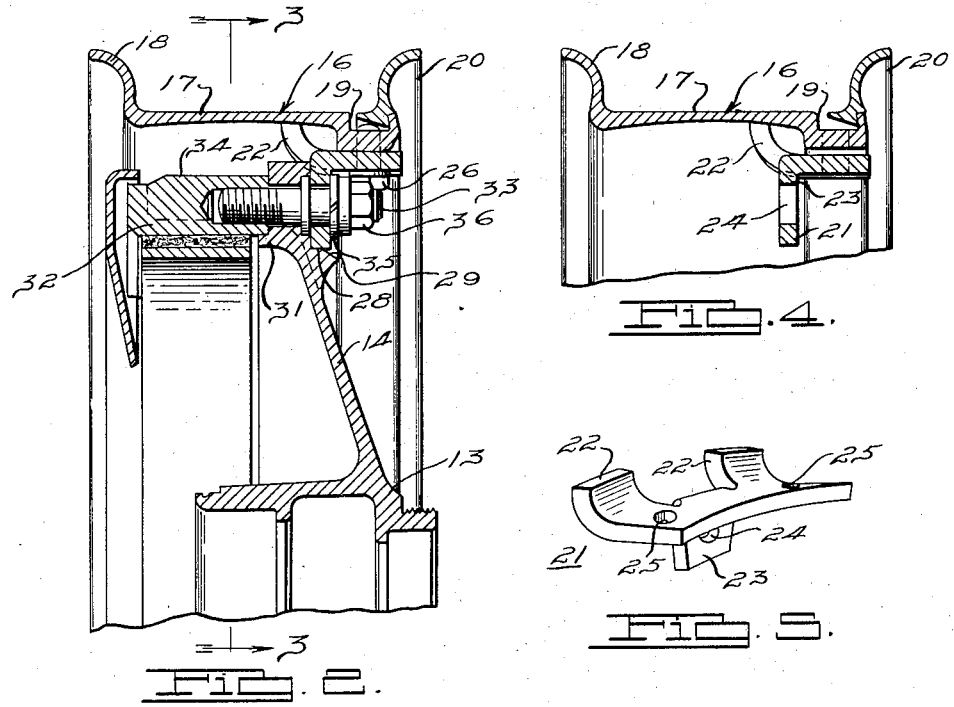
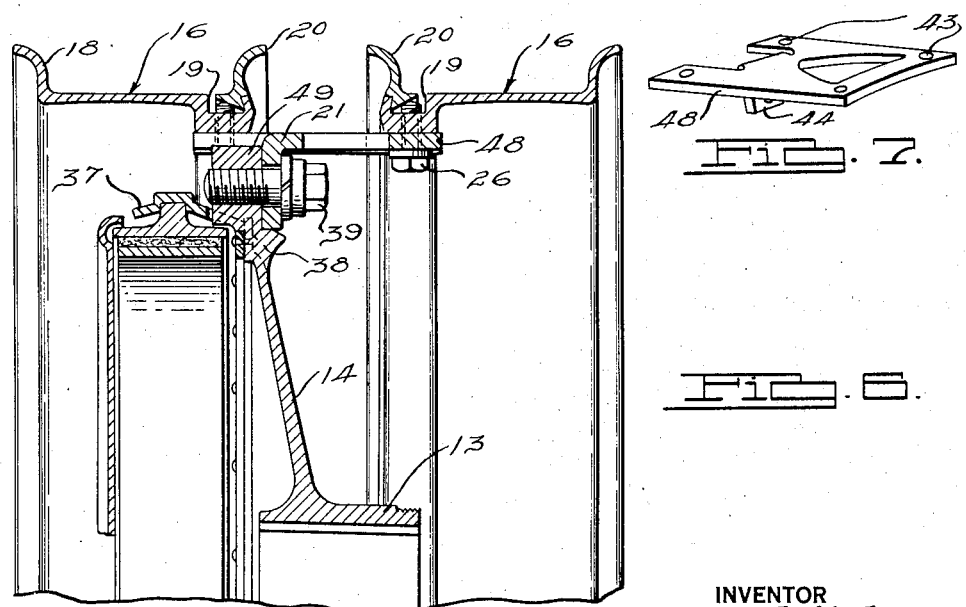
INVENTOR
*Emil A. Nelson.*
BY
*Harness, Dickey, Pierce & Hann*
ATTORNEYS.

Dec. 18, 1934.  E. A. NELSON  1,985,054
WHEEL
Filed Jan. 21, 1931  3 Sheets-Sheet 3
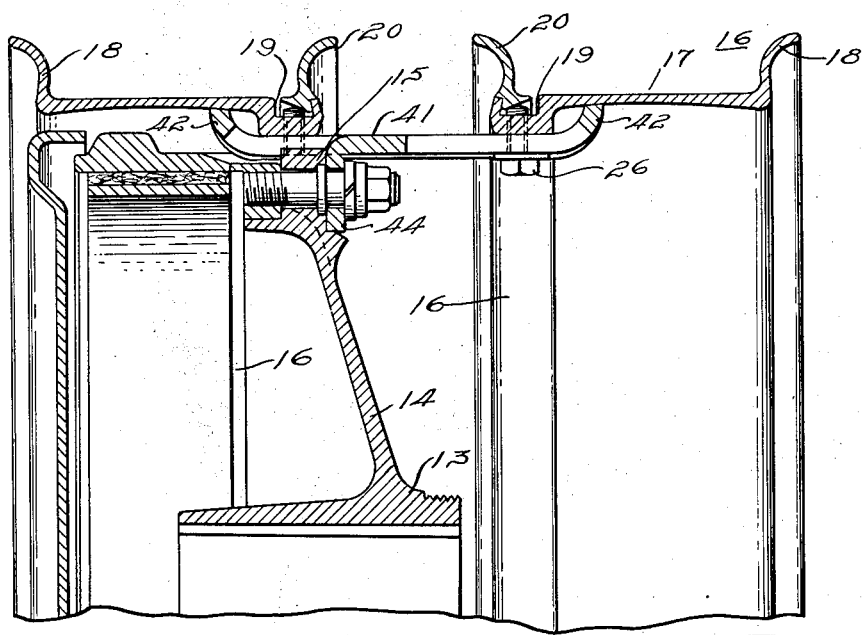
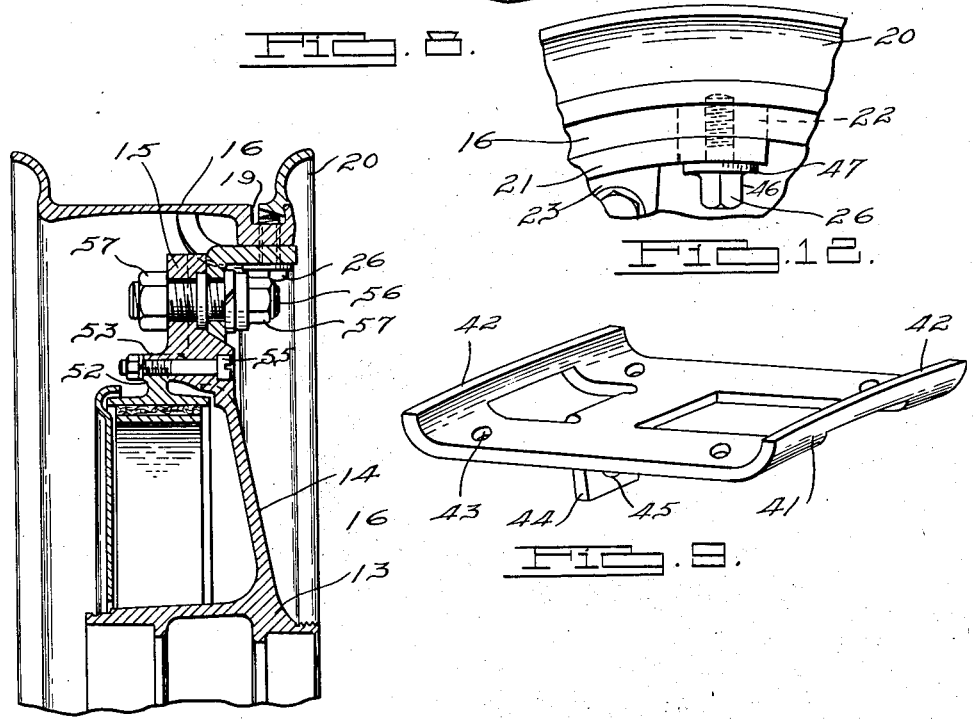
INVENTOR
*Emil A. Nelson.*
BY
*Harness, Dickey, Pierce & Haun*
ATTORNEYS.

Patented Dec. 18, 1934

1,985,054

UNITED STATES PATENT OFFICE 1,985,054

WHEEL

Emil A. Nelson, Detroit, Mich.

Application January 21, 1931, Serial No. 510,170

5 Claims. (Cl. 301—12)

My invention relates to wheels and particularly to wheels having interchangeable rims of the demountable type.

In my Patent Number 1,744,915, which was granted to me on January 28, 1930, I disclosed a wheel comprising a hub and a plurality of associated spokes to which one or a plurality of rims are attachable directly to the ends of the spokes. In this construction the felloe, heretofore conventionally employed, was eliminated from the wheel structure and a single rim, a plurality of rims or rims of different diameters were capable of being attached to the spokes when a predetermined set of a variety of attaching brackets were utilized.

My present invention is an improvement on the structure above patented, having for an object the provision of a wheel which is lighter in weight, simpler in construction, cheaper in manufacturing cost and which embodies features for increasing the ease with which one or a plurality of rims may be mounted on or demounted from the wheel.

Another object of my invention is to utilize the mounting stud for supporting a rim on a wheel of the above described type, for the additional purpose of retaining a brake drum on the wheel to thereby permit a drum of maximum diameter to be employed.

A further object of my invention is to provide a plurality of sets of brackets for attaching rims to a wheel, either of which sets may be utilized to retain one or a plurality of rims on the wheel with the center line of the one or the plurality of rims conforming to the plane of support through the wheel.

A still further object of my invention is to provide a wheel of the above mentioned type with a plurality of brackets which shall be so co-ordinated with the wheel as to chord the rim when assembled thereon by the brackets.

A still further object of my invention is to provide a wheel with a bracket of the above mentioned type which is placed under an initial tension when supported on the rim to strengthen the rim and to assist in preventing its deformation in service.

Numerous other objects and features of novelty of my invention will be either specifically pointed out or will become apparent when referring, for a better understanding of my invention, to the following description in conjunction with the accompanying drawings wherein:

Figure 1 is a broken view in elevation of a wheel embodying features of my invention, Fig. 2 is an enlarged broken view of the structure shown in Fig. 1 taken along the line 2—2 thereof, Fig. 3 is a broken view, in section, of the structure shown in Fig. 1 taken along the line 3—3 thereof, Fig. 4 is a broken view of a section of the rim and the supporting bracket shown in Fig. 2, Fig. 5 is a perspective view of the bracket shown in Figs. 2 and 4, Fig. 6 is a broken sectional view of a wheel structure showing a modified form of my invention, Fig. 7 is a perspective view of the bracket shown in Fig. 6, Fig. 8 is a broken sectional view, similar to the structure shown in Fig. 2 with the exception that two rims are supported on the wheel, Fig. 9 is a perspective view of the bracket shown in Fig. 8, Fig. 10 is an elevational view of a wheel embodying a further modified form of my invention, Fig. 11 is an enlarged broken view, in section, of the structure shown in Fig. 10 taken along the line 11—11 thereof, and Fig. 12 is a broken view in elevation, of a rim and bracket mounted on a wheel.

My invention comprises in general a hub 13 having a disc portion 14 of conical shape preferably forming an integral part of the hub as shown. Relatively short projections 15 are provided on the outer periphery of the disc portion 14 and constitute spoke-like members for the wheel. A rim 16 is attachable directly to the end of the projections 15 by various methods which will be described hereinafter.

The wheel proper, constructed as a unit, is cast without the necessity of utilizing baked cores, conventionally employed, and a simple, inexpensive green core is all that is required for providing a central hole in the hub. By having the conical shaped disc portion extend over substantially two-thirds of the radius of the wheel, and by having short projections mounted on its periphery in the nature of spokes, considerable resistance is offered by the wheel both against tensional strains and lateral bending stresses. The construction embodies the desirable features of the disc wheel which includes that of providing maximum strength per unit weight and also the desirable brake-cooling features which obtain in the spoke type of wheel.

Referring more particularly to Figs. 1 and 2 I have shown the hub 13, the disc 14 and the projections 15 as comprising a unit member which is cast from steel or other metals in a well known manner. The rim 16, which is mountable thereon, is provided with a web portion 17 having an upstanding flange 18 on one of its ends and a locking channel 19 on its opposite end. The cross-sectional area of the rim in the vicinity of the channel is thicker than the other portion of the rim for the purpose of receiving the mounting means for the rim by means of which it is attached to the wheel. A split locking ring 20 of conventional form is shown associated with the channel 19 which is forced into locking engagement therewith when a tire is mounted on the rim and inflated.

In Fig. 5 I have disclosed a bracket 21 which is attachable to the rim 16 and to the projections 15 for the purpose of supporting the rim on the wheel. The bracket 21 is a stamped metal member having radially outwardly projecting fingers 22 and an oppositely or radially inwardly projecting lug 23, having an aperture 24 therein. Apertures 25 are provided in the main body portion of the bracket 21 and are utilized for the purpose of attaching the bracket to the rim by means of bolts 26 as shown in Figs. 2 and 12.

In Fig. 4 I have disclosed the bracket 21 positioned adjacent to the rim 16 before being attached in fixed relation thereto with the fingers 22 abutting against the web 17 of the rim. It will be noted that the body portion of the bracket is spaced from the supporting portion of the rim, and when drawn tightly thereagainst by the bolts 26, the fingers 22 will be drawn firmly against the under side of the web 17 and will be sprung to effect a bias to the fingers which strengthen the central portion of the rim against the distorting effects of loads carried thereby due to the initial tension loading of the fingers.

The base of the projections 15 are provided with lug seats 28 which are directly associated with sloping or cam surfaces 29. When the lugs 23 are drawn against the projections 15 the bottom edges thereof engage the sloping surfaces 29 which causes the brackets 21 and the rim to be forced outwardly from the hub in the vicinity of the projections 15 until the lugs 23 rest in the lug seats 28. By this construction the rim 16 is slightly corded between the projections 15 and thereby effects a bias downwardly in the vicinity of the projections for assisting the brackets 21 in retaining the rim in firm engagement with the wheel and for eliminating, to a great extent, the tendency of the load on the wheel to lift the rim from the projections when the load is exerted midway between the projections and the consequent tendency to loosen the retaining bolts.

The inner surface of the disc portion 14, as shown in Fig. 2, is provided with a flange 31 which is encompassed by a brake drum 32 supported against the inner surface of the projections by means of studs 33 which engage lugs 34 on the drum and draw the drum tightly against the inner surface of the projections. This construction provides a maximum diameter to the inner surface of the brake drum and at the same time permits the axially outer stem of the stud 33 to be utilized as a means for retaining the brackets 21 on the front surface of the projections through the medium of lock washers 35 and nuts 36.

It is to be understood that, when means other than the studs 33 are employed for attaching the brake drum to the wheel, bolts may be substituted for the lock washers 35 and nuts 36 for retaining the brackets 21 on the front surface of the projections. Such a construction is shown in Fig. 6 wherein the brake drum is supported by means of a flanged annular member 37 which is riveted or otherwise attached to a flange 38 provided on the periphery of the disc 14. This, and similar methods of mounting a brake drum on a disc or other drum supporting members are disclosed in my Patent No. 1,750,682 which was granted to me on March 18, 1930. In this arrangement bolts 39 attach the brackets 21 to the projections 15.

In Fig. 8 I have shown a wheel similar to that illustrated in Fig. 2 with the exception that a second rim is attached to the wheel proper by means of brackets 41 which are substituted for the brackets 21 in Fig. 2. The bracket 41 is more clearly shown in Fig. 9 as including upturned flanges 42 at each of its ends which bear the same relation to, and effect the strengthening of the web 17 of the rim 16, as the fingers 22 of bracket 21 heretofore referred to.

The flanges are drawn tightly against each of the rims by means of bolts 26 extending through apertures 43 provided in the body portion of the brackets. The brackets and the rims are then mounted on the projections 15 by means of downwardly extending lugs 44 having apertures 45 therein. The lugs 44 on the brackets 41 function in the same manner as the lugs 22 on the brackets 21, for chording and retaining the rims on the wheel.

In comparing the brackets 21 and 41 in Figs. 5 and 9 respectively it will be noted that the lug 23 on the bracket 21 is provided between the apertures 25 and the fingers 22 while in the brackets 41 the apertures 43 are provided between the fingers or flanges 42 and the lug 44.

Referring to Figs. 2 and 8 it will be noted that by mounting a single rim, by means of the brackets 21 having the apertures 25 provided outwardly of the supporting lugs 23, the center line of the rim is cut by a plane through the conical disc 14 and the disc supports the weight through the wheel uniformly throughout its area and thereby eliminates local stressing which would tend to deform the disc.

When two rims are mounted on the brackets 41, it will be noted that the lugs 44 thereof are positioned between the apertures 43, and the center line between the two rims cuts the hub at the base of the supporting disc 14. This arrangement likewise prevents the local stressing of the disc 14 and retains the disc in rigid position at all times and prevents the distortion or deforming of the brake drum. In either arrangement air passes freely between the outer periphery of the disc 14 and the inner periphery of the rim 16 between the projections 15 and assists in preventing the overheating of the drum as pointed out in the foregoing patents.

It will be noted from Figs. 2 and 8 that similar rims may be employed on the front and rear wheels and be supported thereon by the brackets 21 or that brackets 41 may be substituted for brackets 21 and a pair of like rims mounted together in fixed predetermined relation and both rims supported on the rear wheel by the lugs 44 of the brackets. The method of forming the stem of the inner tube of the tire, to permit the rim to be mounted in juxtaposition to the brake drum is clearly illustrated and described in the aforementioned patents.

The bolts 26 employed to retain the brackets 21 and 41 on the inner periphery of the rim 16, are illustrated in Fig. 12 as being provided with a head 46 having a flange 47 on its inner edge. The flange 47 engages the arcuate surface of the brackets 21 and 41 and is thereby distorted as the bolts 26 are screwed into the rim 16 to retain the brackets thereon. The distortion of the flange at its outer edge, due to the arcuate shape of the bracket, provides a bias to the flange which firmly retains it in engagement with the bracket and prevents the bolts 26 from working loose in service. The flange and the arcuate surface effect a locking engagement which eliminates the lock washers or like locking elements conventionally employed.

Referring again to Fig. 6 the wheel shown therein is constructed for a vehicle of considerably less capacity than that for which the wheel shown in Figs. 2 and 8 is provided. As less braking surface will be required for the lighter vehicle the brake drum may be mounted as above described and shown in Fig. 6 and be of considerably less diameter than that of the brake drums illustrated in Figs. 2 and 8.

The fingers or flanges 42 on the brackets 41 have been omitted from brackets 48 which are employed in place of the bracket 41 for securing the two rims together and on the wheel. The bracket 48 is shown more clearly in Fig. 7 to be similar to the bracket 41 shown in Fig. 9 with the exception that the radially outwardly turned flanges 42 are omitted therefrom. It is to be understood that a bracket (not shown) similar to brackets 22 may be employed for mounting a single rim on the wheel and that the fingers 22 may be omitted therefrom. In either arrangement the added strength provided by the fingers or flanges is not required because of the narrower construction of the rim and the reduction in load to which the rim is subjected.

In Figs. 10 and 11 I have shown a somewhat modified form of the structure shown in Figs. 2, 6 and 8 in which the brake drum is provided with a rib on its outer periphery which is engaged by a flange 53 at the inner base of the projections 15 for retaining the brake drum against movement in the plane of the wheel. The two flanges are provided with semi-circular recesses which when aligned provide circular apertures through which bolts 55 extend and retain the flange in fixed position against the base of the projections 15.

Bolts 39 above described, may be provided in threaded holes in the projections 15 or shouldered studs 56 may be substituted therefor as shown in Fig. 11 which are retained on the projections by nuts 57. The axially outer portions of the studs are threaded and are employed to retain the brackets on the projections 15 in a manner similar to that above mentioned with reference to the structure shown in Figs. 2 and 8.

In any of the above noted constructions the clamping of the brake drum on the periphery of the disc 14 or on the projections 15 adds considerable strength to the wheel assembly and aids in preventing its lateral distortion.

It will thus be seen that I have provided a wheel construction which includes interchangeable rims and two complete sets of mounting brackets. One or two of the rims may be mounted on the brackets and then attached to the wheel by bolts or studs which are positioned in a plane normal to the wheel. In this construction the retaining bolts or nuts are easily accessible to the vehicle operator and no more effort is required for removing or mounting two rims than is required for mounting a single rim, except for the additional weight of the second rim. By employing the rim-mounting studs for supporting a brake drum on the wheel the brake drum will be of maximum diameter and provide a maximum braking area.

While I have described and illustrated several embodiments of my invention it will be apparent to anyone skilled in the art that many changes, omissions, additions and substitutions may be made therein without departing from the spirit and scope of my invention as set forth in the accompanying claims.

I claim as my invention:

1. In combination, a wheel body, a rim supporting sheet metal bracket adapted to be removably mounted on the outer periphery of the body, said bracket having a bent over supporting projection stamped from the bracket and generally directed in a plane transversely thereof.

2. In combination, a wheel body, a rim supporting sheet metal bracket adapted to be mounted on the outer periphery of the body, a rim having a cylindrical base portion and a rib, said bracket having a seat for supporting the rib on the rim, and a bent over supporting projection formed on the bracket and directed radially and outwardly into engagement with the base portion of the rim.

3. In combination, a wheel body, a removable rim having a base portion, brackets for mounting the rim on the wheel body, seats on the brackets for supporting the rim solely on the brackets, resilient fingers on the brackets for engaging the base portion of the rim, and means for holding the rim on the bracket and the fingers in resilient engagement with the base portion of the rim.

4. In combination, a wheel body, inboard and outboard rims adapted to be mounted on the body, and a bracket for supporting the rims on the body, said bracket having radially outwardly turned resilient fingers at its ends, and a radially inwardly turned lug therebetween, means for holding the rims on the bracket, with the ends resiliently urged into engagement with such rims by means of their resiliency, and means securing the inturned lugs to the wheel body.

5. In combination, a wheel body, inboard and outboard rims adapted to be mounted on the body, a bracket for supporting the rims on the body, said bracket having radially outwardly turned resilient flanges at its ends, and a radially inwardly turned lug therebetween, means for holding the rims on the bracket with the ends thereof resiliently urged into engagement with the rim by means of their resiliency, and means including tapered surfaces on the lugs and wheel body for securing the lugs to the wheel body.

EMIL A. NELSON.